United States Patent [19]

Martin et al.

[11] Patent Number: 5,060,994
[45] Date of Patent: Oct. 29, 1991

[54] VEHICLE DOOR GUARD

[76] Inventors: Charlesworth R. Martin, 1391 E. Tanners Creek Dr., Norfolk, Va. 23513; Edward O. Adusei, 1322 Pershing Ct., Virginia Beach, Va. 23456

[21] Appl. No.: 550,484

[22] Filed: Jul. 10, 1990

[51] Int. Cl.⁵ ............................................. B60R 19/42
[52] U.S. Cl. ..................................... 293/128; 267/140
[58] Field of Search ........................... 293/1, 102, 128; 267/140

[56] References Cited

U.S. PATENT DOCUMENTS

| | | | |
|---|---|---|---|
| 3,147,176 | 9/1964 | Haslam | 293/128 X |
| 3,582,134 | 6/1971 | Shaff | 293/128 X |
| 3,843,475 | 10/1974 | Kent | 293/1 X |
| 3,982,780 | 9/1976 | Keith | 293/128 |
| 4,014,583 | 3/1977 | Forbes | 293/128 |
| 4,127,294 | 11/1978 | Cooper | 293/128 |
| 4,294,478 | 10/1981 | Marquette | 293/128 |
| 4,498,697 | 2/1985 | McGlone et al. | 293/128 |
| 4,690,446 | 9/1987 | Warren | 293/128 |
| 4,708,380 | 11/1987 | Cruz | 293/128 |
| 4,726,614 | 2/1988 | Myers et al. | 293/128 |
| 4,871,205 | 10/1989 | Bray | 293/128 |
| 4,911,959 | 3/1990 | Miyakawa | 428/31 |

*Primary Examiner*—Dennis H. Pedder
*Attorney, Agent, or Firm*—Griffin Branigan & Butler

[57] ABSTRACT

A vehicle door guard (10) is constructed of a one-piece resilient elongated body member (12) extruded as one piece to have a slot (18) along a length of a front surface thereof. After the elongated body member is extruded, two separated, semi-circular, transverse hinge notches (42 and 44) are cut into the front surface for separating first and second end portions (58 and 60) of the body member and first and second elongated magnets (14 and 16) are mounted in first and second portions of the elongated slot in the respective first and second end portions. The semi-circularly shaped notches are separated by a plateau (46), through which the elongated slot extends without a magnet therein, by an approximate distance equal to the radius (37) of the semi-circular notches.

15 Claims, 2 Drawing Sheets

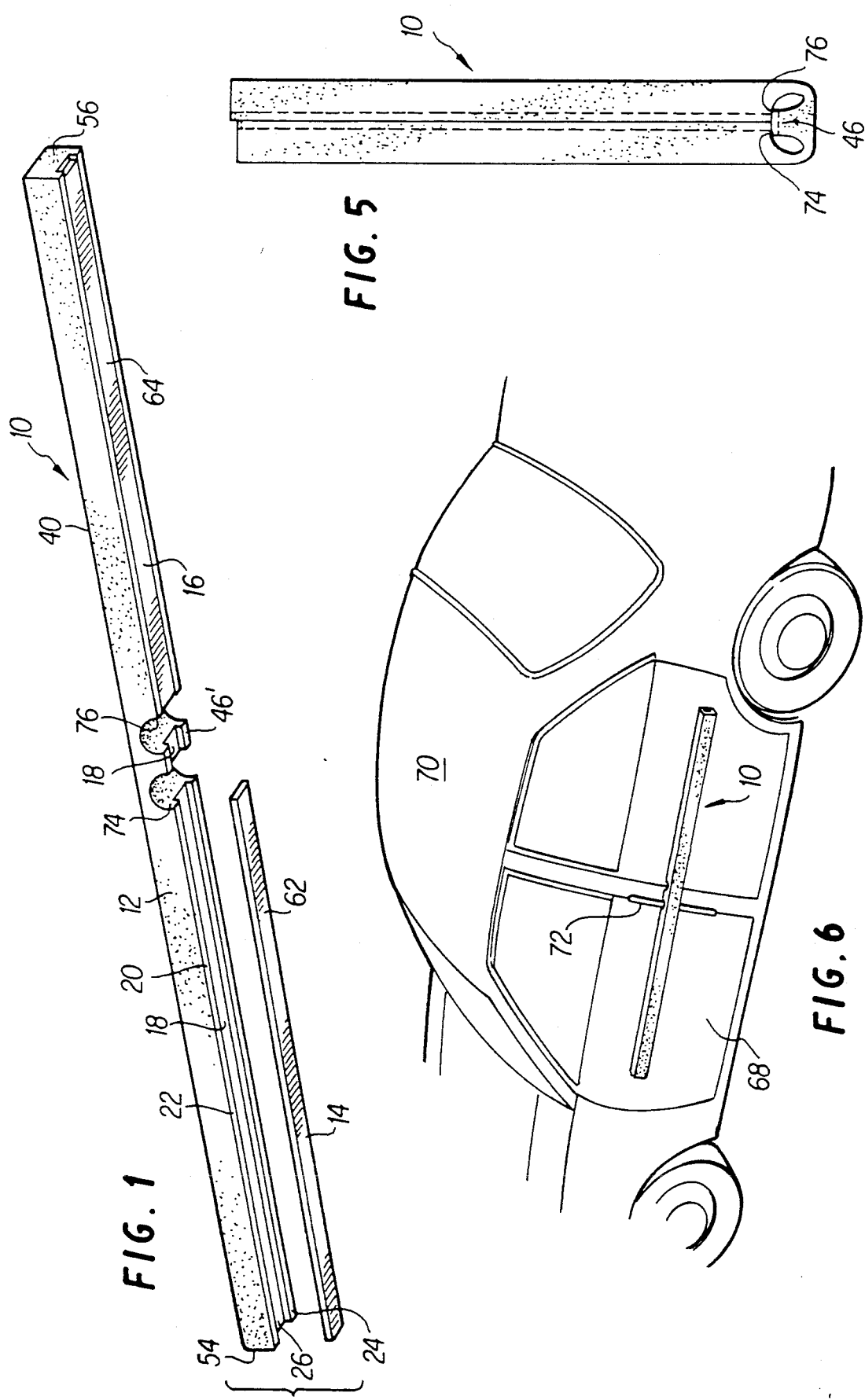

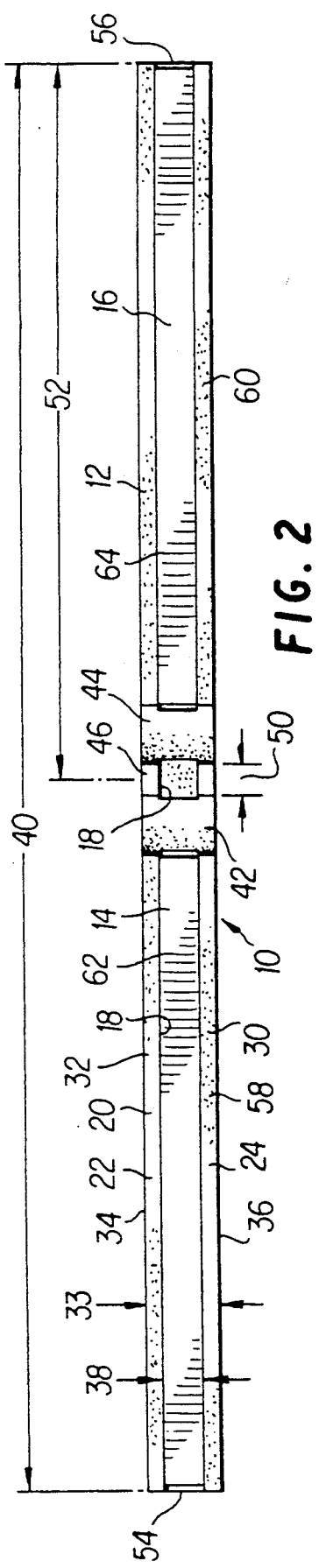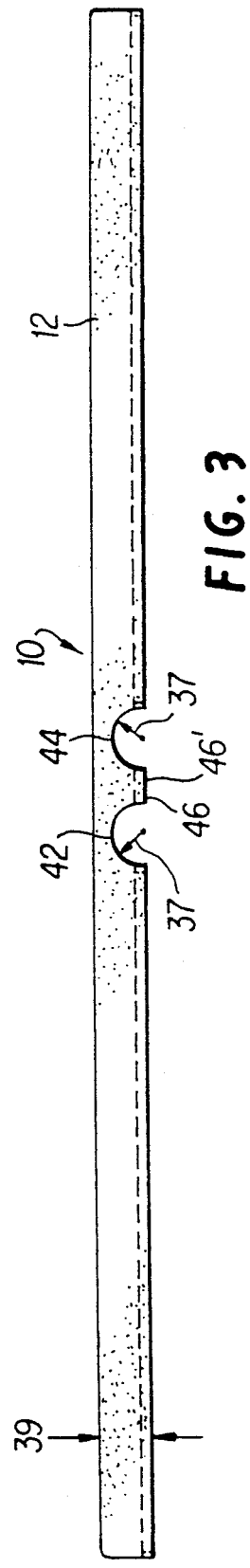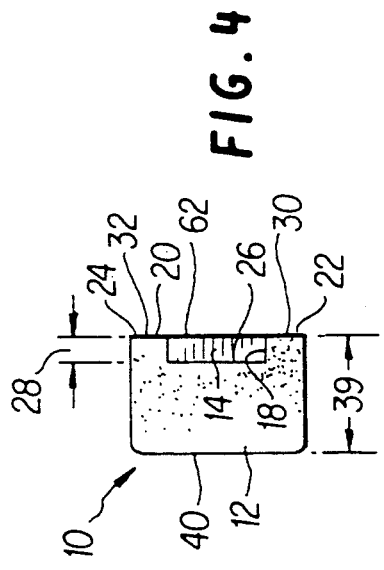

5,060,994

VEHICLE DOOR GUARD

BACKGROUND OF THE INVENTION

This invention relates generally to the art of guards, or bumpers for protecting outer surfaces of motor vehicles from contact with hard objects, such as doors of other vehicles. In particular, this invention relates to portable guards which are mounted on exterior surfaces of cars by magnets.

U.S. patents which disclose prior-art vehicle body protector bumpers include U.S. Pat. Nos. 4,726,614 to Myers et al, 4,871,205 to Bray, 4,708,380 to Cruz, 4,294,478 to Marquette, 4,498,697 to McGlone, and 4,690,446 to Warren. All of these patents disclose vehicle body protectors and most of these protectors include magnets for holding them to outer surfaces of vehicles. However, most of the devices of these patents appear to be rather complicated and expensive to construct. Thus, it is an object of this invention to provide an effective portable vehicle door guard which can be constructed relatively easily and inexpensively so that it can be sold relatively cheaply.

Yet another difficulty with many of the devices of the above mentioned U.S. patents is that even though they are constructed in relatively complicated manners, they are still relatively awkward to extend for use and to fold up into neat bundles when not in use. Therefore, it is an object of this invention to provide a portable vehicle door guard which not only is easy and inexpensive to construct but yet which is easy to extend and use while also being easy to fold up into a neat bundle and which stays in this bundle configuration.

Yet another difficulty with some of the devices of the above mentioned patents is that edges of magnets thereof can easily gouge or otherwise scratch outer surfaces of vehicle bodies which they are intended to protect. Therefore, it is yet another object of this invention to provide a portable vehicle guard held onto outer surfaces of vehicle bodies which cannot easily gouge or otherwise scratch said surfaces.

Yet another problem for some of the devices of the above mentioned U.S. patents is that they cannot be easily used on vehicles having vertically-extending protrusions at edges of doors because these protrusions hold them away from outer surfaces of vehicles having such protrusions, thereby preventing good magnetic contact. Accordingly, it is yet another object of this invention to provide a portable vehicle door guard which accommodates protrusions on bodies of vehicles so that such protrusions do not prevent contact of magnets thereof with outer surfaces of such vehicles.

SUMMARY

According to principles of this invention, a portable vehicle door guard is constructed of a one piece resilient elongated body member molded as one piece but having at least one hinged notch in a front surface thereof positioned between first and second end portions at which the elongated body member can be easily folded about an axis approximately parallel to the front surface and approximately perpendicular to an axis of elongation of the body member so as to bring first and second front surface portions of the first and second end portions into contact with one another. An elongated slot on the front surface includes first and second slot portions in the respective first and second end portions in which are respectively mounted first and second elongated magnets. The one piece resilient elongated body member can be extended with the first and second end portions being approximately aligned so as to attach front surfaces of said magnets on outer surfaces of vehicles by magnetic attraction to hold the elongated resilient body member on the vehicle outer surface and it can be folded on itself to bring the front surfaces of the magnets into contact so as to hold the first and second end portions together in a folded bundle configuration.

In a preferred embodiment, the elongated body member is extruded of a low density foam polyethylene with the slot on the front surface thereof. Two transverse semi-circular hinge notches are cut into the front surface. The semi-circular notches are separated by a plateau having a front-surface length which is approximately the same as the radius of the notches to allow the front surfaces of the first and second magnets to come flush together along their length when the elongated body member is hinged about the hinge notches.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of invention in a clear manner.

FIG. 1 is an isometric, exploded view of a portable vehicle door guard of this invention;

FIG. 2 is a front view of the vehicle door guard of FIG. 1;

FIG. 3 is a side view of the vehicle door guard of FIGS. 1 and 2 in an extended configuration;

FIG. 4 is an end view of the vehicle door guard of FIGS. 1-3;

FIG. 5 is a side view of the vehicle door guard of FIGS. 1-4 in a folded configuration; and FIG. 6 is an isometric view of a vehicle having a vehicle door guard of FIGS. 1-5 in an extended configuration mounted on doors thereof.

DESCRIPTION OF THE PREFERRED EMBODIMENT

A vehicle door guard, or bumper, 10 includes a single resilient elongated body member 12 and first and second plastic elongated plastic magnetic strips 14 and 16.

The elongated body member 12 is constructed of a resinous, closed-cell, plastic foam, such as a low density polyethylene foam, by an extrusion process so as to have approximately a rectangular cross-sectional shape with an elongated slot 18 in a front surface 20 thereof extending the length of the elongated body member 12. In this regard, first and second shoulders 22 and 24 bound sides of the elongated slot 18 and a trough surface 26 defines a bottom of the slot. A shoulder height 28, in a preferred embodiment, is approximately 1/16 of an inch, which is the same as the depth of the elongated slot 18 (which is, a distance of the trough surface 26 from front surfaces 30 and 32 of the shoulders 22 and 24). A width 33 of the elongated body member 12, that is, a distance between side surfaces 34 and 36, is approximately two inches while a slot width 38 is approximately one inch. A thickness 39 of the elongated body member 12, that is, the distance from front shoulder surfaces 30 and 32 to a back surface 40, is approximately 1¼ inches.

As mentioned above, the elongated body member 12 is extruded from a mold having a shape like that of an end of the elongated body member 12 as shown in FIG. 4. The elongated body member 12, once extruded, is cut to have a definite body length 40, which in one preferred embodiment, is approximately 40 inches.

Once the elongated body member 12 has been extruded, two separated transverse hinge notches 42 and 44 are cut into the front surface 20 thereof to have a small plateau 46 between them. The hinge notches form axes which extend approximately parallel to said front surface 20 and perpendicular to an axis of elongation of the elongated body member 12 as well as to side surfaces 34 and 36. The semi-circular hinge notches 42 and 44 have radiuses 37 of approximately ¾ of an inch which are centered approximately in a plane of the front shoulder surfaces 30 and 32. The hinge notches are separated a distance 50 of approximately ¾ inch, that is, the radius of the notches. It should be noted that the plateau 46 has the same cross sectional shape as the rest of the elongated body member 12, except at the notches 42 and 44. That is, the plateau includes the elongated slot 18. A center of the plateau 46 is approximately a distance 52 of 20 inches from ends 54 and 56 of the elongated body member 12 and the hinged notches 42 and 44 define first and second end portions 58 and 60 of the elongated body member 12.

The first and second magnetic strips 14 and 16 are basically elongated and flat. In cross sectional shape, the magnetic strips 14 and 16 are rectangular, having a shape and size which is essentially identical to the shape and size of the elongated slot 18. That is, when the magnetic strips 14 and 16 are positioned in the elongated slot 18, front surfaces 62 and 64 of the magnetic strips 14 and 16 are approximately in the same plane as the front shoulder surfaces 30 and 32. Also, side edge surfaces of the magnetic strips 14 and 16 are in contact with inside surfaces of the shoulders 22 and 24. The first magnetic strip 14 is of a length for extending approximately from the first end 54 to the first notch 42, that is, the length of the first end portion 58, while the second magnetic strip 16 is of a length for extending approximately from the second end 56 to the second hinge notch 44, which is the length of the second end portion 60. The elongated slot 18 at the plateau 46 has no magnetic strip therein. In the preferred embodiment the first and second magnetic strips 14 and 16 are resilient plastic magnetic strips having adhesive backings. The adhesive backings adhere the magnetic strips to the slot trough 26 in the first and second end portions 58 and 60. Such magnetic strips are sold by Tandy Corporation of Fort Worth, Tex.

Reviewing now a method of constructing the vehicle door guard 10, first the elongated body member 12 is extruded to have the cross sectional shape of FIG. 4 and cut to an appropriate length. Thereafter, the transverse hinge notches 42 and 44 are cut therein. First and second magnetic strips 14 and 16 are cut to the appropriate length for fitting the slot 18 in the respective first and second end portions 58 and 60 and they are adhered therein by the adhesive backing. Thus, the vehicle door guard 10 is produced essentially of three pieces the elongated body member 12 and the first and second magnetic strips 14 and 16.

In order to apply the vehicle door guard 10 to an outer surface of a vehicle, as is depicted in FIG. 6, the first and second end portions 58 and 60 are extended outwardly from one another about the first and second hinge notches 42 and 44 so that the vehicle door guard 10 is essentially in a linear configuration. The front surface 20 is then placed against an outer surface 68 of a vehicle 70 so that the front surfaces 62 and 64 of the first and second magnetic strips 14 and 16 also contact the outer surface 68 and the vehicle 70. Magnetic attraction of the first and second magnetic strips 14 and 16 hold the vehicle door guard 10 to the outer surface 68 of the vehicle 70. The plateau 46 contacts the vehicle surface to provide support for the door guard 10 thereat in this extended configuration. As can be seen in FIG. 6, if the vehicle 70 has a vertically extending outwardly protruding obstruction, such as a plastic door edge guard 72, the vehicle door guard 10 can be positioned so that one of the hinge notches 42 or 44 receives the door edge guard 72. Thus, the front surfaces 62 and 64 of the first and second magnetic strips 16 and 18 continue to be flush against the outer surface 68 of the vehicle 70.

When the vehicle door guard 10 is not in use, the first and second end portions 58 and 60 thereof can be folded together about the hinge notches 42 and 44 so that the front surfaces 62 and 64 of the first and second magnetic strips 14 and 16 come in contact with one another in front of a front surface 46' of said plateau between said notches, as is shown in FIG. 5. Magnetic attraction between the first and second magnetic strips 14 and 16 hold the first and second end portions 58 and 60 together so that the vehicle door guard 10 remains in a compact bundle, half the length of its extended configuration shown in FIG. 6. The plateau 46, being positioned between the hinge notches 42 and 44 contacts first and second inner ends 74 and 76 of the first and second end portions 58 and 56 so as to prevent the first and second end portions 58 and 60 from sliding longitudinally relative to one another when these members are in the folded configuration of FIG. 5. In other words, the plateau 46 prevents undue movement of a composite hinge formed by the two hinge notches 42 and 44 so as reduce wear at a composite hinge.

It will be appreciated by those of ordinary skill in the art that the vehicle door guard of this invention is relatively easily and inexpensively constructed. Further, the vehicle door guard of this invention is light in weight so that it is easy to use and it can be easily folded and maintained in a folded configuration so that it can be easily stored. Further, the semi-circular transverse hinge notches can be placed over protrusions on a vehicle outer surface so that front surfaces of magnetic strips of the vehicle door guard make flush contact with the vehicle outer surface. Also, separating hinge notches provides a supporting plateau which prevents undue movement at the plateau both when the vehicle guard is in an extended configuration and mounted on an outer surface of a vehicle and while the vehicle door guard is in a folded configuration.

Since the front shoulder surfaces 30 and 32 are in approximately the same plane as the front surfaces 62 and 64 of the first and second magnets 14 and 16 they prevent edges of the first and second magnets from gouging into the outer surface 68 of the vehicle 70.

Also, it will be understood by those of ordinary skill in the art that the vehicle door guard of this invention is uncluttered in appearance while providing a highly functional and beneficial purpose.

While the invention has been particularly shown and described with reference to a preferred embodiment, it will be understood by those skilled in the art that changes in form and detail may be made therein without departing from the spirit and scope of the invention. For example, numerous dimensions have been given for a preferred embodiment of the invention; however, it will be understood that the invention can be made having other dimensions. Also, it may be possible to make the invention with a single transverse hinge notch, although if this is done, the notch will probably have to be larger than each of the hinge notches already described and the elongated body member 12 at such an elongated notch will not be adequately supported and protected from excess movement both during a deployed extended mode as shown in FIG. 6 or during a folded mode as shown in FIG. 5. A magnetic strip could also be placed in the slot at the plateau.

The embodiments of the invention in which an exclusive property or privilege are claimed or defined as follows:

1. A portable vehicle body bumper for being selectively placed upon an outer surface of a vehicle body to protect said outer surface from contact with other objects, such as doors of other vehicles, said vehicle body bumper comprising:

a resilient elongated body member molded as one piece having front and back surfaces and side surfaces, said body member having a thickness dimension between said front and back surface and being made of a material such that when said front surface lies against said vehicle outer surface being protected said back surface will impinge upon said other objects and prevent them from striking said protected outer surface, said front surface of said elongated body member defining a slot extending along a length thereof and being bounded by shoulders adjacent said side surfaces, said front surface of said elongated body member further defining at least first and second transverse hinge notches therein positioned between first and second end portions of said elongated body member at which said elongated body member can be easily folded about axis approximately parallel to said front surface and approximately perpendicular to an axis of elongation of said body member so as to bring first and second front surface portions of said first and second end portions into contact with one another, said at least first and second hinge notches being separated by a plateau;

first and second elongated magnets having front and back surfaces and side surfaces, said first and second elongated magnets being respectively positioned in said slot in said first and second end portions;

whereby said resilient elongated body member can be extended with said first and second end portions being approximately aligned one to the other so as to attach said front surfaces of said magnets on said outer surface of said vehicle by magnetic attraction to hold said elongated resilient body member on said vehicle outer surface and can be folded on itself at said first and second hinge notches to bring said front surfaces of said first and second magnets into contact so as to hold said first and second end portions together in a folded configuration;

wherein said plateau is of such a length that it allows said front surfaces of said magnets, to make flush contact with one another when said vehicle body bumper is in said folded configuration approximately in front of a front surface of said plateau.

2. A portable vehicle body bumper as in claim 1 wherein said slot is approximately of the same shape and size as said first and second magnetic strips so that said front surfaces of said magnetic strips are approximately in planes of front surfaces of said shoulders.

3. A portable vehicle body bumper as in claim 1 wherein said plateau includes said slot, but has no magnetic strip mounted therein.

4. A portable vehicle body bumper as in claim 1 wherein said transverse hinge notches are substantially semi-circular in shape.

5. A portable vehicle body bumper as in claim 4 wherein the length of the front surface of said plateau is approximately a radius of said semi-circular notches.

6. A portable vehicle body bumper as in claim 1 wherein said single resilient elongated body member is extrusion molded to have said elongated slot in said front surface thereof.

7. A portable vehicle body bumper as in claim 6 wherein said transverse hinge notches are semi-circular in configuration.

8. A portable vehicle body bumper as in claim 7 wherein a length of the front surface of said plateau is approximately the same as an approximate radius of the semi-circular notches.

9. A method of constructing a portable vehicle body bumper comprising the steps of:

extruding a continuous resilient elongated piece of foam resinous plastic having a front surface thereof;

cutting said elongated body member to be a definite length and forming two transverse hinge notches in said front surface to be substantially semi-circular in configuration and to be separated by a plateau, said notches being formed so that a length of said plateau is approximately the same as an approximate radius of said substantially semi-circular hinge notches;

mounting two magnets on said front surface on first and second end portions of said elongated body member positioned on opposite sides of said transverse hinge notches;

whereby a vehicle body bumper is produced whose first and second portions can be extended about said transverse hinge notches into a linear configuration so that front surfaces of said magnets can be placed against a vehicle outer surface for mounting said vehicle body bumper on said vehicle outer surface by magnetic attraction of the first and second magnetic strips and which can be folded about eh hinge notches so that said front surfaces of said magnetic strips come in contact with each other and hold the vehicle door guard in said folded configuration.

10. A method as in claim 9 wherein the step of extruding said continuous resilient elongated piece of foam resinous plastic includes extruding an elongated slot in the front surface thereof and the step of mounting said two magnets includes mounting said magnets in said slot.

11. A method as in claim 10 wherein the step of extruding said elongated piece of foam resinous plastic includes forming a longitudinally extending slot in said front surface of said body member and wherein no magnet is mounted in a slot of said plateau.

12. A portable vehicle body bumper as in claim 1 wherein the notches and plateau are so sized that the front surfaces of said magnets make flush contact with one another when said vehicle body bumper is in said folded configuration approximately in the middle of said plateau front surface.

13. A portable vehicle body bumper as in claim 12 wherein inner ends of said first and second end portions are immediately adjacent said front surface of said plateau when said body bumper is in said folded configuration.

14. A portable vehicle body bumper as in claim 1, wherein inner ends of said first and second end portions are immediately adjacent said front surface of said plateau when said body bumper is in said folded configuration.

15. A portable vehicle body bumper for being selectively placed upon an outer surface of a vehicle body to protect said outer surface from contact with other objects, such as doors of other vehicles, said vehicle body bumper comprising:

a resilient elongated body member molded as one piece having front and back surfaces and side surfaces, said body member having a thickness dimension between said front and back surfaces and being made of a material such that when said front surface lies against said vehicle outer surface being protected said back surface will impinge upon said other objects and prevent them from striking said protected outer surface, said front surface of said elongated body member defining a slot extending along a length thereof and being bounded by shoulders adjacent said side surfaces, said front surface of said elongated body member further defining at least first and second transverse hinge notches therein positioned between first and second end portions of said elongated body member at which said elongated body member can be easily folded about axes approximately parallel to said front surface and approximately perpendicular to an axis of elongation of said body member so as to bring first and second end portions into contact with one another, said at least first and second hinge notches being separated by a plateau;

first and second elongated magnets having front and back surfaces and side surfaces, said first and second elongated magnets being respectively positioned in said slot in said first and second end portions;

whereby said resilient elongated body member can be extended with said first and second end portions being approximately aligned one to the other so as to attach said front surfaces of said magnets on said outer surface of said vehicle by magnetic attraction to hold said elongated resilient body member on said vehicle outer surface and can be folded on itself at said first and second hinge notches to bring said front surfaces of said first and second magnets into contact so as to hold said first and second end portions together in a folded configuration;

wherein said transverse hinge notches are substantially semi-circular in shape, with the length of a front surface of said plateau being approximately an approximate radius of said substantially semi-circular notches.

* * * * *